A. G. BETTMAN.
SANITARY SUGAR HOLDER AND DISPENSER.
APPLICATION FILED FEB. 6, 1913.
1,084,530.
Patented Jan. 13, 1914.
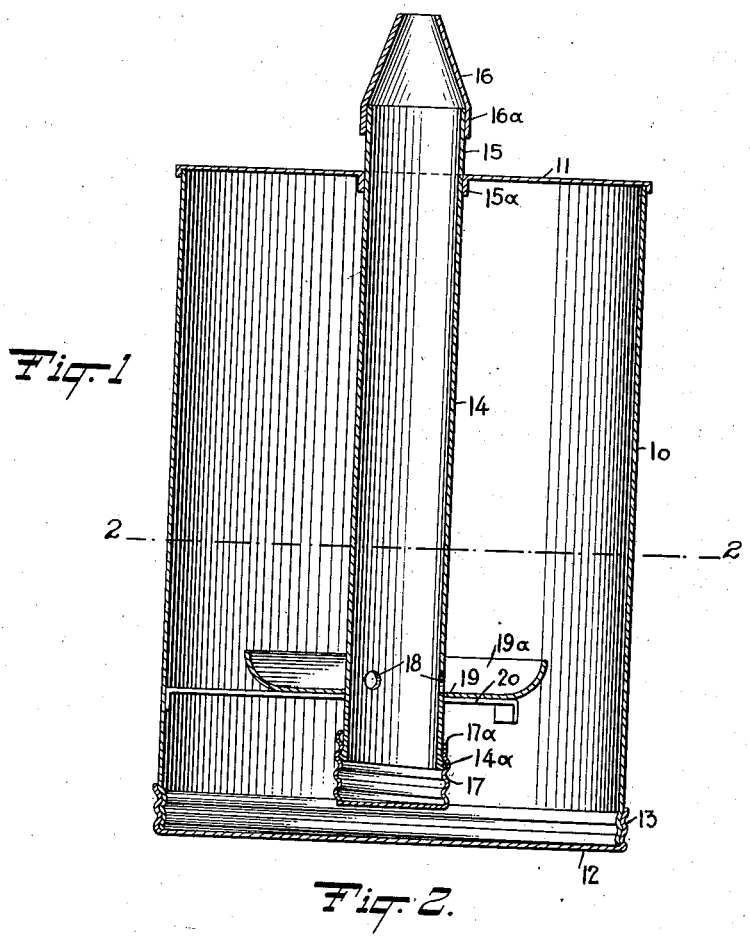
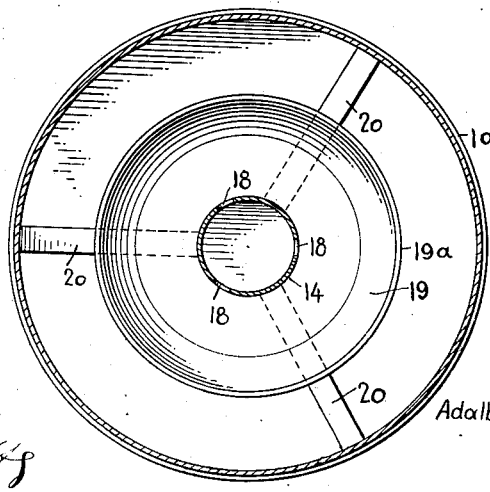
WITNESSES
George Bambay.
J. L. McAuliffe
INVENTOR
Adalbert G. Bettman
BY Munn & Co
ATTORNEYS

UNITED STATES PATENT OFFICE.

ADALBERT G. BETTMAN, OF PORTLAND, OREGON.

SANITARY SUGAR HOLDER AND DISPENSER.

1,084,530.  Specification of Letters Patent.  Patented Jan. 13, 1914.

Application filed February 6, 1913. Serial No. 746,563.

*To all whom it may concern:*

Be it known that I, ADALBERT G. BETTMAN, a citizen of the United States, and a resident of Portland, in the county of Multnomah and State of Oregon, have invented a new and Improved Sanitary Sugar Holder and Dispenser, of which the following is a full, clear, and exact description.

My invention has for its design to provide a holding and dispensing device especially useful for dispensing sugar, and arranged for automatically discharging a measured quantity of sugar as desired.

A further object of my invention is to provide means for readily adjusting the device to vary the measured quantity that will be discharged.

In the employment of ordinary open sugar bowls in hotels, restaurants and the like, it not infrequently happens that patrons return the individual spoon to the bowl after the spoon has been dipped in coffee or other food, thereby depositing drops, or portions of the food in the sugar bowl making the contained sugar in the bowl unsightly and unsanitary. Unthinking people often return the individual spoon to the bowl after the spoon has been passed to the mouth of the user. Furthermore, the ordinary sugar bowl is not properly closed against the entrance of dust. By means of my invention, the unsightly, unsanitary, and often dangerous conditions attending the use of the ordinary sugar bowl are eliminated, and an economical use of the sugar is promoted.

The distinguishing features of my invention, and the important structural elements characterizing the practical embodiment which is illustrated as an example, will be more particularly explained in the specific description hereinafter to be given.

Reference is to be had to the accompanying drawings forming a part of this specification, in which similar characters of reference indicate corresponding parts in both views.

Figure 1 is a vertical section of a container and dispenser embodying my invention; and Fig. 2 is a cross section on the line 2—2 of Fig. 1.

In constructing the illustrated example, the container 10 may be of any desired shape and it and the other elements hereinafter described, may be made of glass, metal, wood, or other suitable material and of a content sufficient to hold a reasonable supply of sugar for table use. The container has a top 11 and a bottom 12, either one of which may be formed or arranged to constitute an inlet for charging the container with a supply of sugar. I have shown the top 11 permanently secured in place, and the bottom 12 with a threaded flange 13 that engages a similar formation on the lower end of the container body 10.

Ranging lengthwise of the container body is a tubular dispensing member 14, which extends at its upper end through the top 11 of the container, as at 15, and has a discharge outlet, which I have shown in the form of a conical cap 16, the base 16ª of which may be removably fitted on the end 15. The inner end of the dispensing member 14 is closed by a threaded cap 17, which engages a flange or equivalent formation 14ª in the form of a convolution or partial convolution of a thread corresponding with the threads of the cap 17. The construction permits the cap to be moved toward or from the lower end of the member 14, to vary the distance between the said cap and one or more inlet openings 18, there being preferably a series of such openings. The inlet openings 18 are a sufficient height above the lower end of the dispensing member 14 so that the space between the inlets and the cap 17 will constitute a measuring chamber to hold a measured quantity of sugar, which quantity can be varied when desired by an adjustment of the cap 17 as specified. To prevent the entire removal of the cap 17, any suitable formation may be given to the same, or to the member 14, as for instance, by forming a flattened portion 17ª on the cap 17, which flattened portion will be engaged by the flange 14ª, should the cap be sufficiently turned.

With the described construction, when the predetermined measured quantity of sugar has entered the dispensing member 14 through the inlets 18, there will be no further tendency of additional quantities of sugar to enter, and when the container is upended, the measured quantity contained below the inlet will be discharged through the outlet cap 16.

In order to prevent the flow of sugar to the interior of the dispensing tube when the measured quantity is being discharged, I provide a guard 19 in the form of a disk supported from the interior of the container body 10 by any suitable supporting means, such for instance as radial arms 20. The guard disk 19 is located a sufficient distance above the bottom 12 of the container that the dispensing member 14 may be supported with the inlets 18 just above the said guard disk. The central portion of the disk has an opening for the passage of the dispensing member, the opening being in alinement with an inwardly extending neck flange 15$^a$ on the top 11. The member 14 may be held friction-tight in the neck band 15$^a$ and disk 19, so that if desired, the dispensing member may be entirely removed, for which purpose the cap 16 may be made friction-tight also, so as to be removable and permit the dispensing member 14 to be withdrawn through the open lower end of the container when the bottom 12 is removed. The outer edge of the guard disk 19 is in the form of an upwardly curved annular flange 19$^a$, of a sufficient height to extend just above the inlet openings 18, whereby little sugar, if any, will enter an inlet 18 while the measured quantity of sugar is being discharged. If a second helping of sugar is desired, it is only necessary to allow the container to rest on its bottom 12 for a short period, until the predetermined measured quantity has been received in the measuring chamber provided below the inlets.

It will thus be observed that the sugar will be economically dispensed and contamination is effectively guarded against by the entrance of a used spoon. Should the sugar become damp, as during moist weather, a slight shaking of the container will suffice to cause it to enter the dispensing member and be discharged. It is to be noted also, that there are no movable parts required, such as a cut-off for the measuring chamber, or the like.

It will be obvious that the device is capable of use in other situations than in hotels, restaurants, etc., that is, either in private homes or in kitchens for the use of other articles than sugar.

The described construction affords a practical means for carrying my invention into effect, and I would state in conclusion that I do not limit myself strictly to the mechanical details herein illustrated, since manifestly the same can be considerably varied without departing from the spirit of the invention.

Having thus described my invention, I claim as new and desire to secure by Letters Patent:

1. A holder and dispensing device for sugar or other materials, comprising a container adapted to hold a supply, and a tubular dispensing member constituting the outlet, said member having an inlet within the body communicating with the interior of the latter, and a guard device adjacent to the said inlet to prevent flow of the material to the inlet when the contents of the dispensing member are being discharged, the said guard extending from the tubular member outwardly toward the wall of the container.

2. A holder and dispensing device for sugar or other materials, comprising a container adapted to hold a supply, and a tubular dispensing member constituting the outlet, said tubular member having its outlet end extending through the top of the container and having its inner end near the bottom of the container, there being lateral inlets near the inner end communicating with the interior of the holder and through which the material may gravitate to the interior of the tubular member, and a guard flange around the dispensing member, below the inlets.

3. A holder and dispensing device for sugar or other materials, comprising a container adapted to hold a supply, a tubular dispensing member constituting the outlet, said member having an inlet within the body communicating with the interior of the latter, and a guard surrounding the dispensing member below the inlet, said guard having an upturned flange.

4. A holder and dispensing device for sugar or other materials, comprising a container adapted to hold a supply, and a tubular dispensing member constituting the outlet, said member having an inlet within the body communicating with the interior of the latter, a guard device adjacent to the said inlet to prevent flow of the material to the inlet when the contents of the dispensing member are being discharged, the said guard extending from the tubular member outwardly toward the wall of the container, and being supported on the body of the holder.

In testimony whereof I have signed my name to this specification in the presence of two subscribing witnesses.

ADALBERT G. BETTMAN.

Witnesses:
 Geo. J. Kelly,
 O. I. Brown.